United States Patent
Hopkins et al.

(10) Patent No.: US 12,072,026 B2
(45) Date of Patent: Aug. 27, 2024

(54) HIGH PRESSURE SEAL ASSEMBLY

(71) Applicant: Shape Technologies Group, Inc., Kent, WA (US)

(72) Inventors: Jordan J. Hopkins, Seattle, WA (US); Ethan E. Romanoff, Bonney Lake, WA (US); Thomas W. Sizemore, Tacoma, WA (US); Mark F. Huntley, Olympia, WA (US)

(73) Assignee: Shape Technologies Group, Inc., Kent, WA (US)

( * ) Notice: Subject to any disclaimer, the term of this patent is extended or adjusted under 35 U.S.C. 154(b) by 0 days.

(21) Appl. No.: 17/732,323

(22) Filed: Apr. 28, 2022

(65) Prior Publication Data

US 2022/0349476 A1    Nov. 3, 2022

Related U.S. Application Data

(60) Provisional application No. 63/182,670, filed on Apr. 30, 2021.

(51) Int. Cl.
*F16J 15/32*    (2016.01)
*F16J 15/3268*    (2016.01)

(52) U.S. Cl.
CPC .................. *F16J 15/3268* (2013.01)

(58) Field of Classification Search
CPC ...... F16J 15/32; F16J 15/3232; F16J 15/3268; F16J 15/20; F16J 15/3208
See application file for complete search history.

(56) References Cited

U.S. PATENT DOCUMENTS 3,249,372 A    5/1966    Pollack
3,335,999 A    8/1967    Lowrey
(Continued)

FOREIGN PATENT DOCUMENTS

EM    0087433890001    11/2021
EM    0087433890002    11/2021
(Continued)

OTHER PUBLICATIONS

Extrusion-Resistant Elastomer Seal, available fluidpowerjournal. com, Internet URL: https://fluidpowerjournal.com/trelleborg-launches-extrusion-resistant-elastomer-seal-demanding-static-high-temperature-high-pressure-oil-as-sealing-environments/ (Year:2019).

(Continued)

*Primary Examiner* — Christine M Mills
*Assistant Examiner* — L. Susmitha Koneru
(74) *Attorney, Agent, or Firm* — Cozen O'Connor

(57) ABSTRACT

A seal assembly includes a seal body and an energizer. The seal assembly is dimensioned to lessen the chance of certain failure modes, such as back jetting of pressurized fluid that gets behind the energizer during a pressurization operation. A ratio of a lateral distance of the seal body to an axial length of the energizer is between 0.400 and 1.7087. A ratio of the lateral distance to an inner radius of the seal body is between 0.10 and 0.401. A ratio of a web thickness of the seal body to the inner radius is between 0.068 and 0.0881. A ratio of the difference between a radial height of the energizer and a groove height of the seal body to the radial height is between 0.050 and 0.155. A ratio of the difference between the radial height and the groove height to the inner radius is between 0.015 and 0.3486.

29 Claims, 7 Drawing Sheets

(56) References Cited

U.S. PATENT DOCUMENTS

| | | | |
|---|---|---|---|
| 3,472,326 A | 10/1969 | Sutliff et al. | |
| 3,905,608 A | 9/1975 | Olsen et al. | |
| D243,406 S | 2/1977 | Mooney et al. | |
| 4,465,201 A | 8/1984 | Chalfant | |
| 4,544,167 A * | 10/1985 | Giroux | F25J 3/0233 |
| | | | 277/382 |
| 4,577,870 A | 3/1986 | Scott et al. | |
| D285,247 S | 8/1986 | Jornhagen | |
| 4,614,348 A * | 9/1986 | Fournier | F16L 37/23 |
| | | | 277/625 |
| 5,050,895 A | 9/1991 | Hashish et al. | |
| D362,902 S | 10/1995 | Reiber | |
| D363,778 S | 10/1995 | Cane et al. | |
| 5,653,449 A | 8/1997 | Martin | |
| 5,810,553 A | 9/1998 | Pedersen | |
| 6,109,376 A | 8/2000 | Pearce | |
| 6,325,389 B1 | 12/2001 | Sharify | |
| 6,736,407 B2 | 5/2004 | Tremoulet et al. | |
| 6,769,695 B2 | 8/2004 | Stephens | |
| 6,776,419 B2 | 8/2004 | Antoun | |
| 7,086,487 B2 | 8/2006 | Nguyen | |
| D595,835 S | 7/2009 | Fu | |
| D616,966 S | 6/2010 | Angell | |
| D638,522 S | 5/2011 | Yoshida et al. | |
| 8,104,140 B2 | 1/2012 | Bassi | |
| 8,387,650 B1 | 3/2013 | Hong | |
| D681,176 S | 4/2013 | Chacko | |
| 8,573,112 B2 | 11/2013 | Nakayama et al. | |
| 9,016,693 B1 | 4/2015 | Shek et al. | |
| D737,497 S | 8/2015 | Burgess et al. | |
| D802,104 S | 11/2017 | Nagahamaya et al. | |
| D834,156 S | 11/2018 | Soria | |
| 10,151,311 B2 | 12/2018 | Chacko et al. | |
| D841,782 S | 2/2019 | Wada | |
| 10,352,457 B2 | 7/2019 | Cid | |
| D865,134 S | 10/2019 | Nagahamaya et al. | |
| D880,661 S | 4/2020 | Foster et al. | |
| 10,947,786 B2 * | 3/2021 | Shotwell | F16J 15/344 |
| D935,576 S | 11/2021 | Jacob | |
| 2003/0122322 A1 | 7/2003 | Tremoulet et al. | |
| 2014/0090554 A1 | 4/2014 | Chalk et al. | |
| 2017/0030466 A1 | 2/2017 | Fonville et al. | |
| 2018/0245558 A1 | 8/2018 | Eck | |
| 2019/0162028 A1 * | 5/2019 | Shotwell | F16J 15/344 |
| 2020/0347966 A1 | 11/2020 | Skinner et al. | |
| 2020/0355270 A1 | 11/2020 | Li et al. | |
| 2021/0131564 A1 * | 5/2021 | Nakamura | F16J 15/3268 |

FOREIGN PATENT DOCUMENTS

| | | |
|---|---|---|
| EP | 0052689 A1 | 6/1982 |
| TW | 2210430001 | 9/2022 |
| WO | 2008112215 A2 | 9/2008 |

OTHER PUBLICATIONS

International Search Report and Written Opinion for PCT/US2022/026821, mailed Aug. 16, 2022, 11 pages.

Non Final Office Action for U.S. Appl. No. 29/781,853, mailed Oct. 27, 2022, 12 pages.

Yoursme AR1857 Packing Kit 18mm XR Seal Repair Kit for Annovi Reverberi Pressure Washer Pump, available in Amazon.com, retrieved Sep. 21, 2022, https://www.amazon.ca/dp/ B08DFZ2D32 (2020).

* cited by examiner

HIGH PRESSURE SEAL ASSEMBLY

CROSS-REFERENCE TO RELATED APPLICATION

This application claims the benefit of U.S. Provisional Application No. 63/182,670, filed Apr. 30, 2021, which is incorporated by reference herein, in its entirety.

TECHNICAL FIELD

The present disclosure generally relates to seals for high pressure fluid pumps and vessels.

BACKGROUND

Description of the Related Art

Currently available high pressure fluid pumps can include plungers that reciprocate within a high pressure chamber to pressurize a fluid in the chamber, and can further include check valves to allow fluids into and out of the high pressure chamber. The pumps typically include seals between the plunger and an inner wall of the chamber and between the check valve and the inner wall of the chamber to prevent high pressure fluid from leaking out of the chamber. In such pumps, the seals must be able to operate in a high pressure environment, withstanding pressures in excess of 10,000 psi.

Referring to FIGS. 1 and 2, a high pressure pump 10 includes a pressure vessel 20 with opposite faces 23 and a bore 22 extending through the pressure vessel 20 between the faces 23. Two inserts 30 (shown as a plunger 30a and a check valve assembly 30b) extend into the bore 22 from opposite ends. The plunger 30a reciprocates within the pressure vessel 20 to pressurize a fluid in the pressure vessel 20. The plunger 30a may be driven by a hydraulically actuated piston 11 or alternatively by a mechanical actuator.

The check valve assembly 30b has check valves 33 for admitting unpressurized fluid into the pressure vessel 20 during an intake stroke of the plunger 30a, and allowing pressurized fluid to exit the pressure vessel 20 after a power stroke of the plunger 30a. Both inserts 30 are held in position relative to the pressure vessel 20 by a yoke 12 that includes end caps 13 secured with threaded rods 15 that bias the end caps 13 toward the pressure vessel 20.

Two seal assemblies 40 (shown as a dynamic seal assembly 40a and a static seal assembly 40b) may seal a gap 21 between the inserts 30 and an inner wall 25 of the bore 22 to prevent fluid from leaking from the pressure vessel 20. The dynamic seal 40a seals a portion of the gap 21 between the reciprocating plunger 30a and the inner wall 25, and the static seal 40b seals a portion of the gap 21 between the stationary check valve body 30b and the inner wall 25. A sleeve 14 adjacent the inner wall 25 between the seal assemblies 40 reduces the volume of the gap 21.

The dynamic seal assembly 40a may include an annular seal 41 and an O-ring 43, both positioned in the gap 21 between the plunger 30a and the internal wall 25 of the bore 22. The seal 41 can include a resilient material, such as an ultrahigh molecular weight polyethylene that fills the gap 21 without extruding out of the gap 21 when the pressure vessel 20 is pressurized. Accordingly, the seal 41 can be relatively stiff at low pressures. The O-ring 43 can be more flexible than the seal 41 at low pressures to seal the gap 21 when the pressure within the pressure vessel 20 is relatively low, for example, at the beginning of the power stroke of the plunger 30a.

The dynamic seal assembly 40a can further include a removable seal seat 42 between the seal 41 and the end cap 13. The seal seat 42 can include a spacer portion 44 that engages the seal 41 and spaces the seal 41 away from an edge 24 between the bore 22 and the face 23 of the pressure vessel 20. In one embodiment, an axial dimension of the spacer portion 44 is approximately equal to a radial dimension of the gap 21. In other embodiments, the spacer portion 44 can have other dimensions.

The seal seat 42 can further include a support portion 45 connected to the spacer portion 44 to support the spacer portion 44 in position and prevent the seal 41 from moving out of the gap 21 when the pressure vessel 20 is pressurized. The seal seat 42 can be relatively stiff in a radial direction to resist deformation toward or away from the plunger 30a, or the seal seat 42 can be sufficiently flexible in the radial direction to allow the spacer portion 44 to flex toward the plunger 30a and provide an additional seal between the plunger 30a and the inner wall 25 as the seal seat 42 is axially compressed.

The dynamic seal assembly 40a can also include an anti-extrusion ring 46 disposed around the seal 41. In one embodiment, the anti-extrusion ring 46 has a generally triangular cross-sectional shape and includes an axial surface 35 and a radial surface 36. The anti-extrusion ring 46 is configured to expand radially against the inner surface 25 of the bore 22 as the pressure vessel 20 is pressurized. Accordingly, the radial surface 36 of the anti-extrusion ring can be sized to bridge a radial gap that might develop between the inner surface 25 of the expanding bore 22 and the spacer portion 44, which does not tend to expand radially as the pressure vessel 20 is pressurized.

Fluid leaking past a seal assembly can have detrimental effects on the operation and life expectancy of components of the high pressure pump 10.

BRIEF SUMMARY

The present disclosure is directed toward methods and apparatus for sealing the components of a high pressure vessel assembly. Specifically, a seal assembly is disclosed that addresses problems associated with the amount of fluid (e.g., water) that gets past (or behind) an energizer of a seal assembly during pressurization. During decompression, the energizer (e.g., an O-ring) serves to seal this fluid, preventing its return to the chamber of the pressure vessel assembly, as the pressure drops. This in turn results in a pressure differential across the energizer, which when released (e.g., when the energizer is no longer able to hold back the fluid against the increasing pressure differential) may result in damage to one or both of the seal and the energizer. By reducing/limiting the amount of fluid that gets behind the energizer, less energy is available to damage the energizer and the seal, resulting in a longer-lived seal assembly.

For seal assemblies that include both a primary seal and an energizer, the position of the energizer relative to the primary seal is one factor that impacts the volume of fluid that ultimately can find its way behind the energizing O-ring. Thus, embodiments of the seal assembly disclosed herein employ a certain (minimized) lateral resting displacement between the energizer and a sealing region of the primary seal (located "behind" the energizer). According to one embodiment, the seal body includes a groove that receives the energizer, and the groove is positioned closer to the sealing region of the primary seal than known seal assemblies.

According to one embodiment, a lateral distance between the furthest reach of the fluid to be sealed (at the point of UHP sealing) and the energizer may be between 0.400 and 1.7087 times an axial length of the energizer.

Additionally, embodiments of the seal assembly disclosed herein diminish the likelihood that one or more failure modes manifest. One embodiment of the seal assembly maintains a specific clearance between the primary seal inner diameter and shaft to be sealed, while ensuring that the stresses in the seal assembly are sufficiently low to prevent failure in shear. The "web" portion of the seal assembly may be sufficiently compliant to ensure stresses are distributed within the primary seal, while remaining rigid enough to ensure that the seal assembly forms an adequate seal with the shaft to be sealed. Further, the energizer should be sufficiently compressed to allow for proper energizing.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
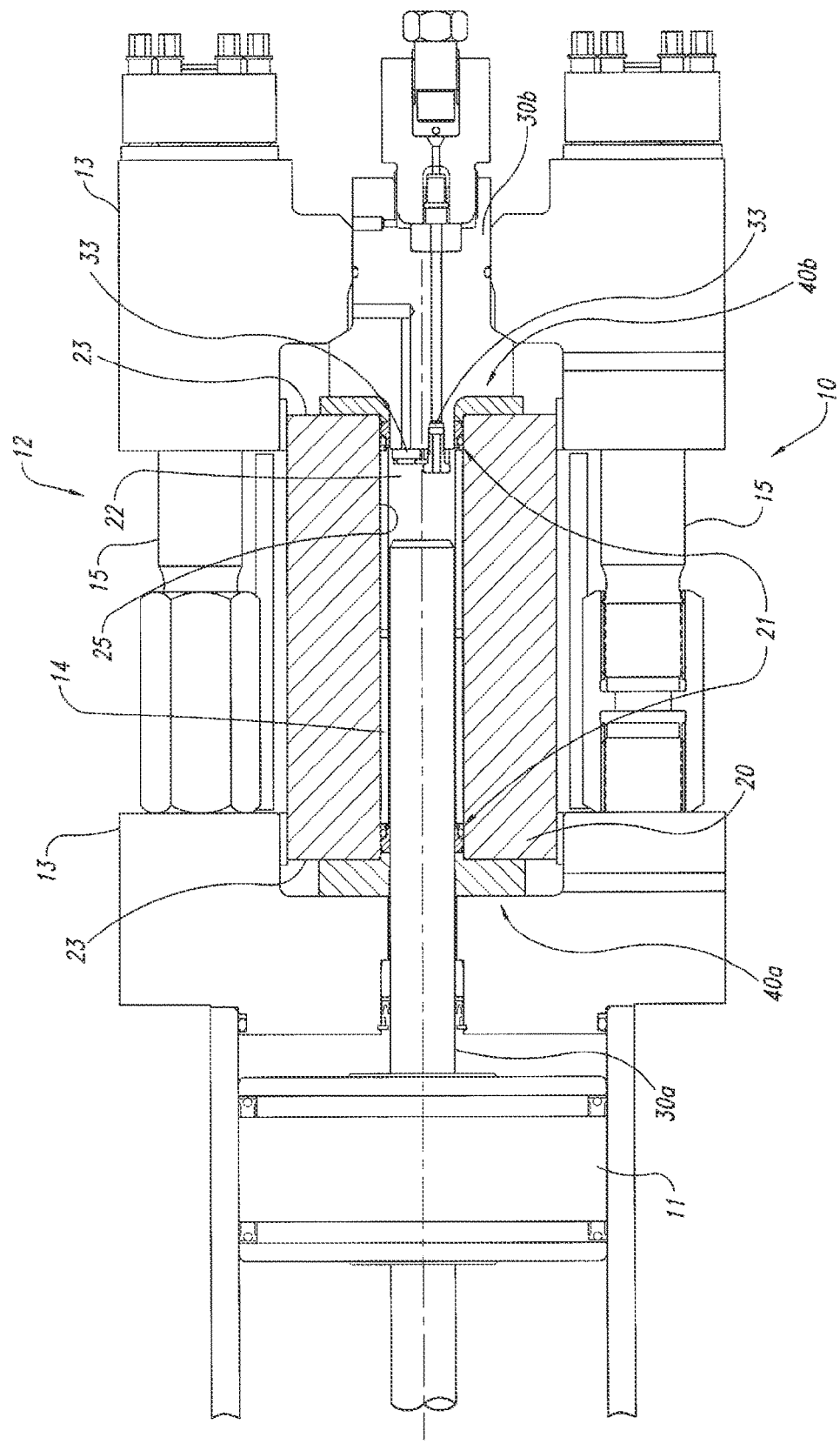
FIG. 1 is a partial cross-sectional, elevation view of a known high pressure pump having a seal assembly.
Figure 2:
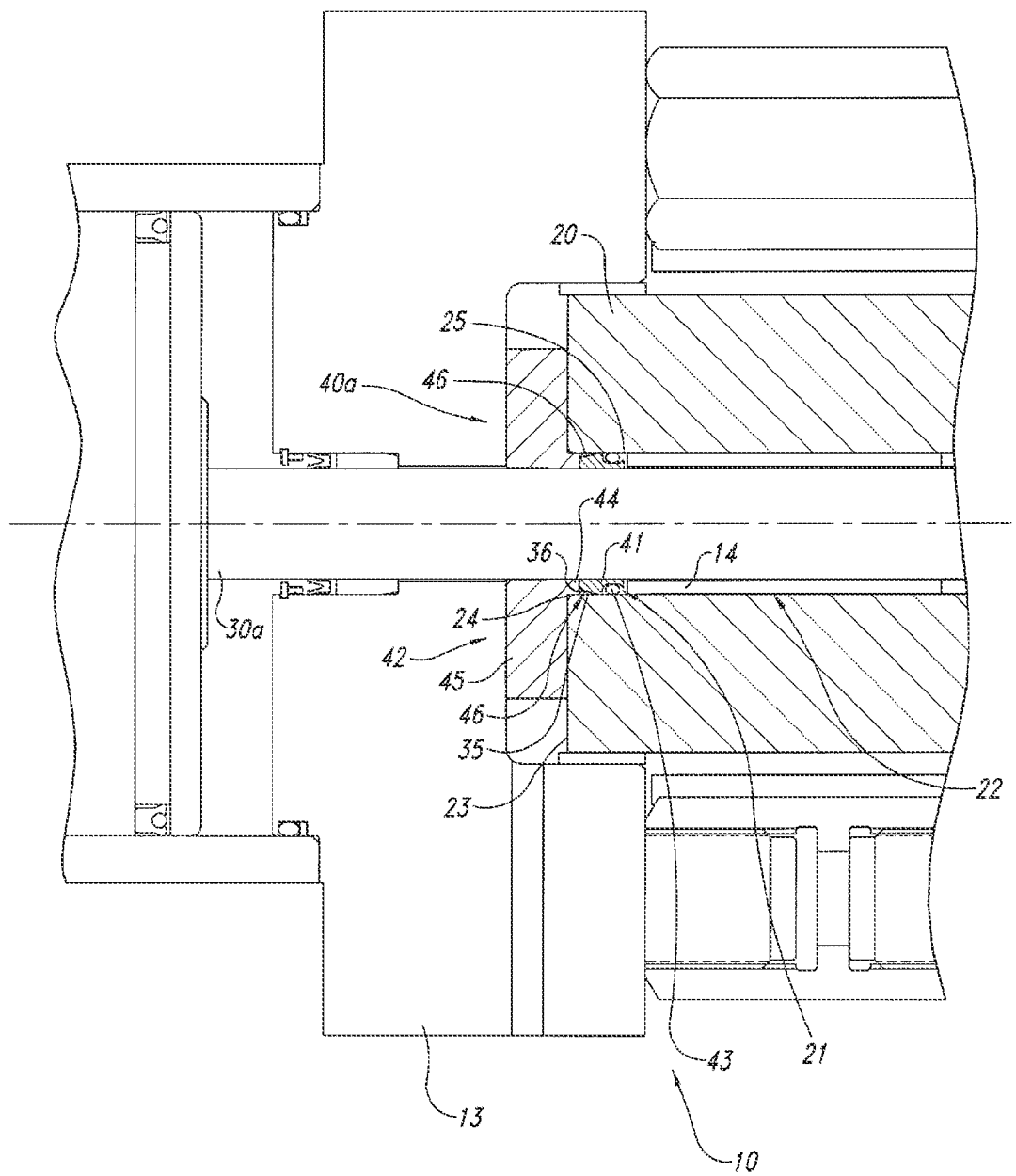
FIG. 2 is a side, elevation view of a portion of the high pressure pump and seal assembly illustrated in FIG. 1.
Figure 3:
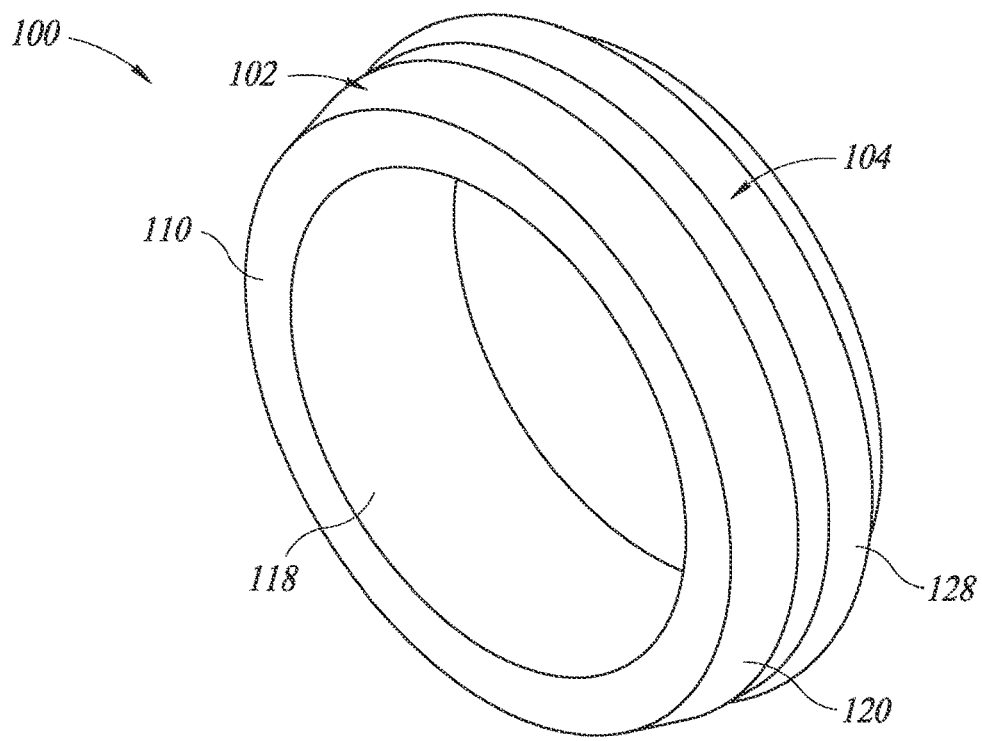
FIG. 3 is a front, isometric view of a seal assembly according to one embodiment.
Figure 4:
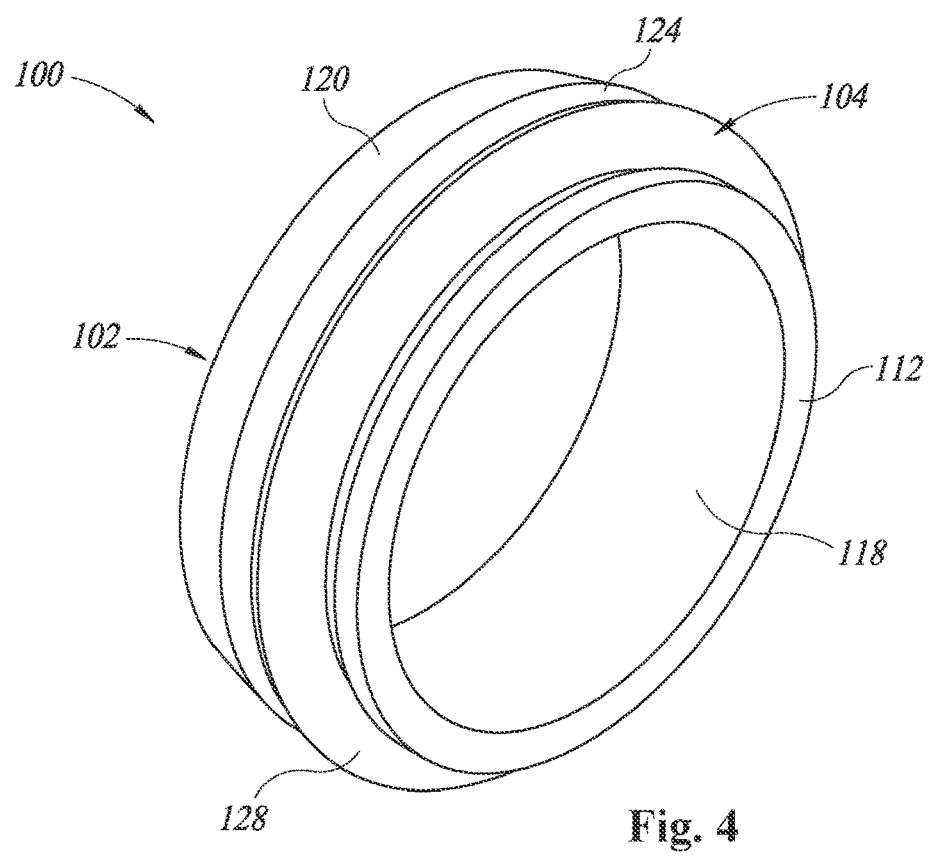
FIG. 4 is a rear, isometric view of the seal assembly illustrated in FIG. 3.
Figure 5:
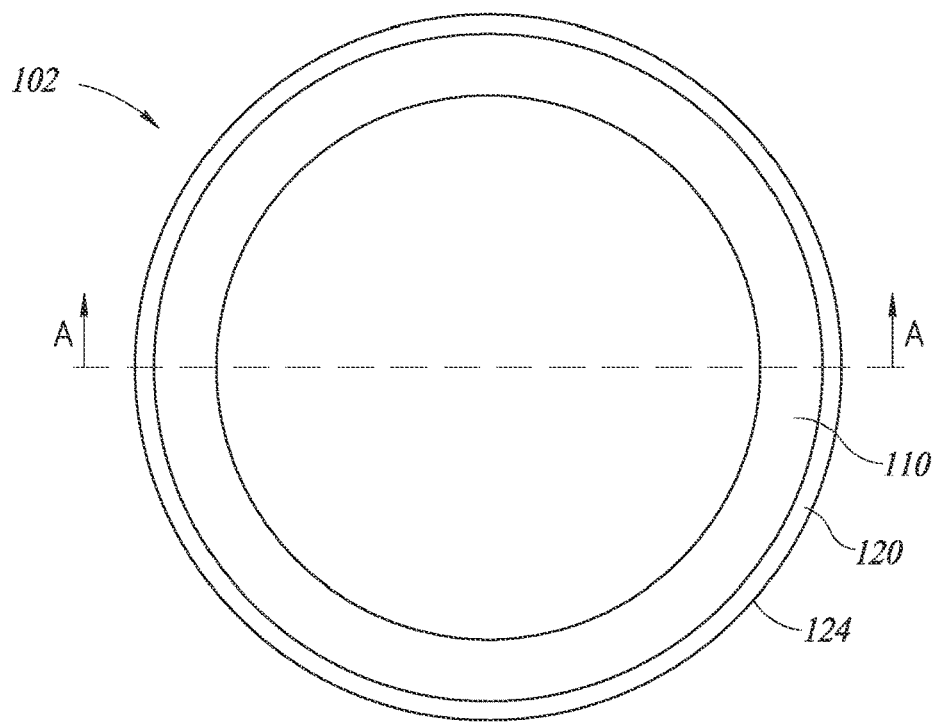
FIG. 5 is a top, plan view of the seal assembly illustrated in FIG. 3.

In the following description, certain specific details are set forth in order to provide a thorough understanding of various disclosed embodiments. However, one skilled in the relevant art will recognize that embodiments may be practiced without one or more of these specific details, or with other methods, components, materials, etc.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Reference herein to two elements "facing" or "facing toward" each other indicates that a straight line can be drawn from one of the elements to the other of the elements without contacting an intervening solid structure. The term "aligned" as used herein in reference to two elements along a direction means a straight line that passes through one of the elements and that is parallel to the direction will also pass through the other of the two elements. The term "between" as used herein in reference to a first element being between a second element and a third element with respect to a direction means that the first element is closer to the second element as measured along the direction than the third element is to the second element as measured along the direction. The term "between" includes, but does not require that the first, second, and third elements be aligned along the direction.

Recitation of ranges of values herein are merely intended to serve as a shorthand method of referring individually to each separate value falling within the range including the stated ends of the range, unless otherwise indicated herein, and each separate value is incorporated into the specification as if it were individually recited herein. All methods described herein can be performed in any suitable order unless otherwise indicated herein or otherwise clearly contradicted by context.

The headings and Abstract of the Disclosure provided herein are for convenience only and do not interpret the scope or meaning of the embodiments.

Referring to FIGS. 3 to 9, a seal assembly 100 includes a seal body 102 and an energizer 104. As shown, the seal body 102 may be tubular, ring-shaped, or annular. According to one embodiment, the seal body 102 is radially symmetrical about a central axis 106 of the seal body 102. The seal assembly 100 may include a bore 108 that extends through the seal body 102 (e.g., parallel to the central axis 106). The seal body 102 may include a first end 110 and a second end 112 opposite one another with respect to a direction parallel to the central axis 106. As shown, the first end 110, the second end 112, or both may be terminal ends of the seal body 102 such that no portion of the seal body 102 extends beyond the respective first and second ends 110, 112 with respect to the direction parallel to the central axis 106. The first end 110 may form a first opening 114 of the bore 108 and the second end 112 may form a second opening 116 of the bore 108. The seal body 102 may include an inner surface 118 that faces the central axis 106, extends between the first end 110 and the second end 112, and at least partially delineates the bore 108.

The seal body 102 may include an outer surface 120, at least portions of which are opposite the inner surface 118 with respect to a radial ray 122 that extends perpendicularly from the central axis 106. At least a portion of the outer surface 120 forms an abutment surface 124 of the seal assembly 100 that contacts and forms a seal with an inner surface of a pressure vessel in which the seal assembly 100 is positioned.

The seal body 102 may include a groove 117 that carries the energizer 104. According to one embodiment, at least a portion of the groove 117 may be delineated by at least one energizer abutment surface 126 of the seal body 102. A shape of the groove 117 may be selected based on the energizer 104 that is to be carried within the groove 117.

Figures 6, 7:
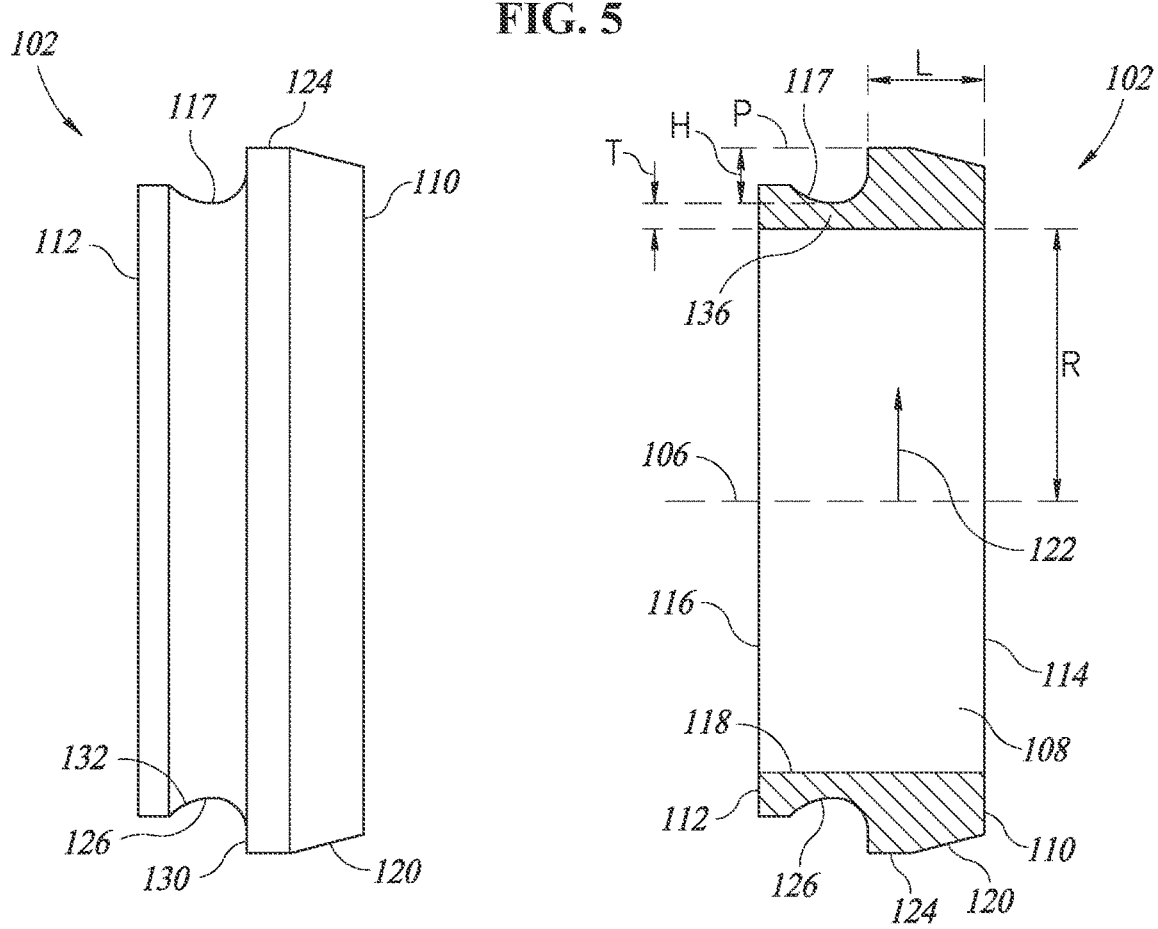
FIG. 6 is a side, elevation view of the seal assembly illustrated in FIG. 3.
FIG. 7 is a cross-sectional view of the seal assembly illustrated in FIG. 3, along line A-A.

For example, as shown in FIG. 7, the at least one energizer abutment surface 126 is curved. The at least one energizer abutment surface 126 may have one, constant, radius of curvature. According to another embodiment, the at least one energizer abutment surface 126 may have portions with different radii of curvature, or a continuously varying radius of curvature. According to one embodiment, the radius of curvature of at least a portion of the at least one energizer abutment surface 126 corresponds to (e.g., matches) a radius of curvature of an outer surface 128 of the energizer 104, when the pressure on both sides of the energizer 104 is equal (i.e., when the energizer 104 is in an unbiased state, and/or when the seal assembly 100 is not currently undergoing a pressurization operation). According to one embodiment, a portion of a perimeter of the at least one energizer abutment surface 126 matches a portion of a perimeter of the energizer 104. According to one embodiment, the portion of the perimeter of the at least one energizer abutment surface 126 matches at least 15% of the perimeter of the energizer 104. According to one embodiment, the portion of the perimeter of the at least one energizer abutment surface 126 matches at least 25% of the perimeter of the energizer 104.

Figure 8:
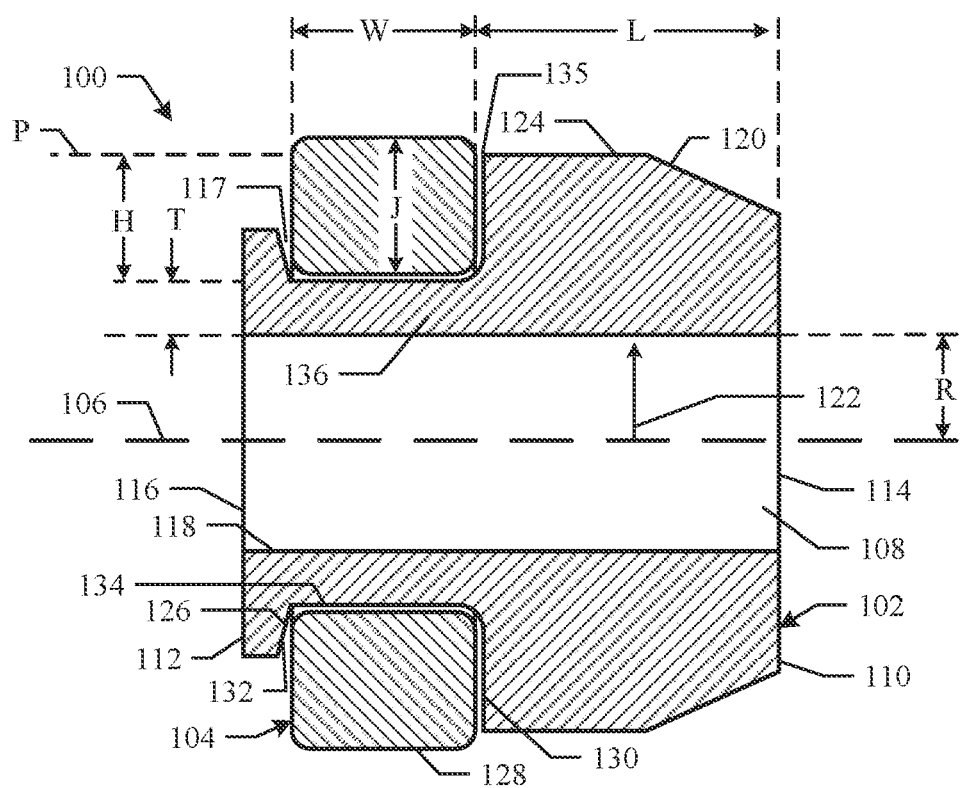
FIG. 8 is a cross-sectional view of a seal assembly, according to another embodiment.

As shown in FIG. 8, the at least one energizer abutment surface 126 may include a first shoulder 130 and a second shoulder 132, that are each non-parallel with respect to the central axis 106. According to one embodiment, the first shoulder 130 and the second shoulder 132 inhibit movement of the energizer 104 relative to the seal body 102 along the direction parallel to the central axis 106. The at least one energizer abutment surface 126 may include a base surface 134 that extends between the first shoulder 130 and the second shoulder 132. The base surface 134 may include a portion that is parallel to the central axis 106.

Figure 9:
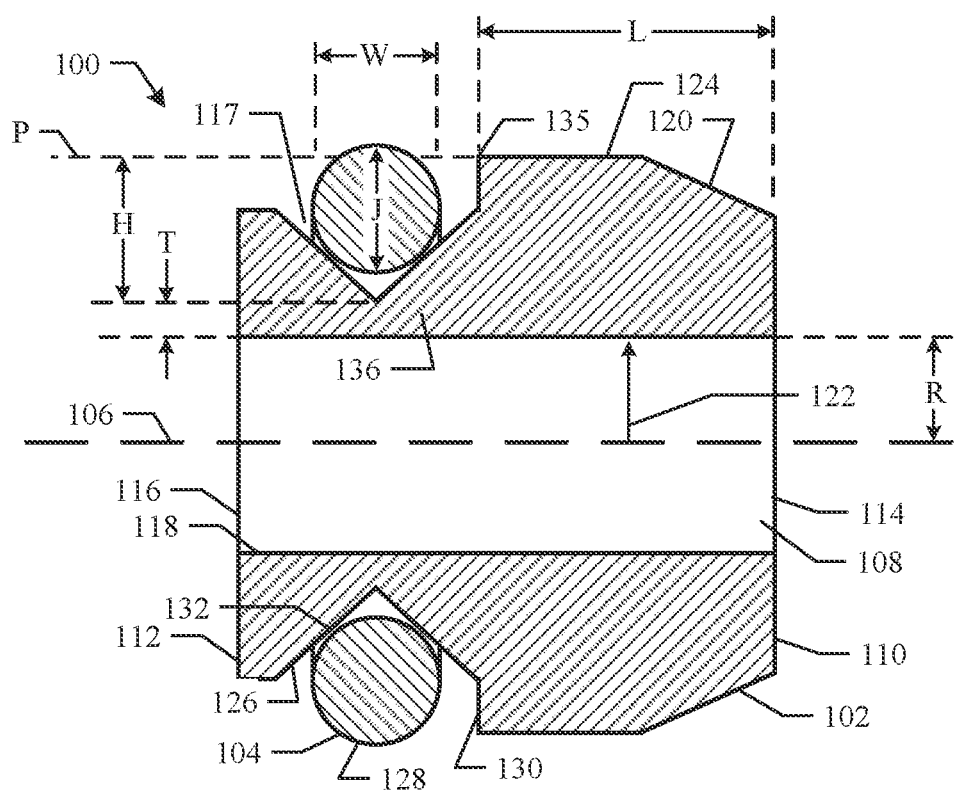
FIG. 9 is a cross-sectional view of a seal assembly, according to another embodiment.

As shown in both FIGS. 7 and 8, at least a portion of the first shoulder 130 may be perpendicular to the central axis 106. As shown in FIG. 9, the at least one energizer abutment surface 126 may include a V-shaped notch. According to one embodiment, the cross-sectional shapes of the groove 117 and the energizer 104 may be mismatched (e.g., the groove 117 may include a V-shaped notch and the energizer 104 may be circular).

The seal body 102 may be dimensioned so as to minimize a lateral distance L, which according to one embodiment is equivalent to the distance "behind" the energizer 104 (e.g., when the energizer 104 is carried by the seal body 102 and the pressure vessel within which the seal assembly 100 is mounted is undergoing a pressurization operation). As shown, when the energizer 104 is carried by the seal body 102, at least a portion of the at least one energizer abutment surface 126 may face (e.g., directly contact) the energizer 104. According to one embodiment, the lateral distance L is measured from the furthest reach of the fluid to be sealed (e.g., the first end 110) to the energizer 104. According to one embodiment, the lateral distance L is measured from the furthest reach of the fluid to be sealed (e.g., the first end 110) to an intersection 135 of the at least one energizer abutment surface 126 (e.g., the first shoulder 130) and the abutment surface 124.

According to one embodiment, the lateral distance L is between 0.400 and 1.7087 times an axial length W of the energizer 104. In other words the seal assembly 100 may include a lateral distance L to axial length W ratio (L/W) between 0.400 and 1.7087. As shown, the axial length W may be measured along a maximum cross-sectional dimension of the energizer 104, along the direction parallel to the central axis 106, when the energizer 104 is seated in the groove 117. For example, the axial length W of the energizer 104 with a circular cross-sectional shape (as shown in FIG. 9) is the diameter of the energizer 104.

According to one embodiment, the lateral distance L is between 0.400 and 0.600 times the axial length W of the energizer 104. According to one embodiment, the lateral distance L is between 0.600 and 1.000 times the axial length W of the energizer 104. According to one embodiment, the lateral distance L is between 1.000 and 1.400 times the axial length W of the energizer 104. According to one embodiment, the lateral distance L is between 1.400 and 1.7087 times the axial length W of the energizer 104. According to one embodiment, the lateral distance L is between 0.400 and 1.000 times the axial length W of the energizer 104. According to one embodiment, the lateral distance L is between 0.400 and 1.400 times the axial length W of the energizer 104.

According to one embodiment, the lateral distance L is measured from the furthest reach of the fluid to be sealed (e.g., the first end 110) to the energizer 104. According to one embodiment, the lateral distance L is measured from the furthest reach of the fluid to be sealed (e.g., the first end 110) to an intersection of the at least one energizer abutment surface 126 (e.g., the first shoulder 130) and the abutment surface 124.

According to one embodiment, the seal body 102 includes an inner radius R measured perpendicularly from the central axis 106 to the inner surface 118. In an embodiment in which a cross-sectional shape of the bore 108 is a circle, the inner radius R is half of the diameter of the circle. According to one embodiment, the lateral distance L is between 0.100 and 0.401 times the inner radius R. In other words the seal assembly 100 may include a lateral distance L to inner radius R ratio (L/R) between 0.100 and 0.401. According to one embodiment, the lateral distance L is between 0.100 and 0.200 times the inner radius R. According to one embodiment, the lateral distance L is between 0.200 and 0.401 times the inner radius R.

A portion of the seal body 102 that includes the groove 117 and carries the energizer 104 may be referred to as a web 136. According to one embodiment, the web 136 must be sufficiently stiff to ensure proper bore lubrication and sufficiently compliant so as not to suffer from destructive shearing forces. A desired stiffness of the web 136, that increases longevity of the seal assembly 100, may be achieved through dimensioning of a web thickness T.

According to one embodiment, the web thickness T is measured from the inner surface 118 to the at least one energizer abutment surface 126 along a direction perpendicular to the central axis 106. As shown, the web thickness T may be the minimum distance between the inner surface 118 and the at least one energizer abutment surface 126 along the direction perpendicular to the central axis 106. For example, in an embodiment in which the at least one energizer abutment surface 126 includes a V-shaped notch (as shown in FIG. 9), the web thickness T may be measured from the inner surface 118 to the nadir of the V-shaped notch along the direction perpendicular to the central axis 106.

According to one embodiment, the web thickness T of the seal body 102 is between 0.030 inches and 0.0385 inches. According to one embodiment, the web thickness T is between 0.068 and 0.0881 times the inner radius R. In other words the seal assembly 100 may include a web thickness T to inner radius R ratio (T/R) between 0.068 and 0.0881.

According to one embodiment, the seal body 102 may be dimensioned so as to resist the radial compression of the energizer 104 while also ensuring proper low pressure sealing of the energizer 104 and while further retaining a [[nominal gap]] between the inner surface 118 and a reciprocating plunger that moves through the bore 108.

As shown, the seal body 102 may include a groove height H measured along a direction perpendicular to the central axis 106 from the at least one energizer abutment surface 126 (e.g., a point on the at least one energizer abutment surface 126 that is closest to the central axis 106) to a plane P that is both tangent to the abutment surface 124 and perpendicular to the direction perpendicular to the central axis 106.

According to one embodiment, the seal assembly 100 includes an energizer compression amount (e.g., a radial energizer compression amount). The energizer compression amount may be a ratio of the difference between a radial height J of the energizer 104 and the groove height H to the radial height J ((J−H)/J). The radial height J of the energizer 104 may be measured along a direction perpendicular to the central axis 106. The radial height J may be equal to the axial length W (e.g., if the cross-sectional shape of the energizer 104 is circular, or another shape with equal height and length). According to one embodiment, the energizer compression ratio is between 0.050 and 0.155.

According to one embodiment, the energizer compression amount may be a ratio of the difference between a radial height J of the energizer 104 and the groove height H to the inner radius R ((J−H)/R). According to one embodiment, the energizer compression ratio is between 0.015 and 0.3486.

Figure 10:
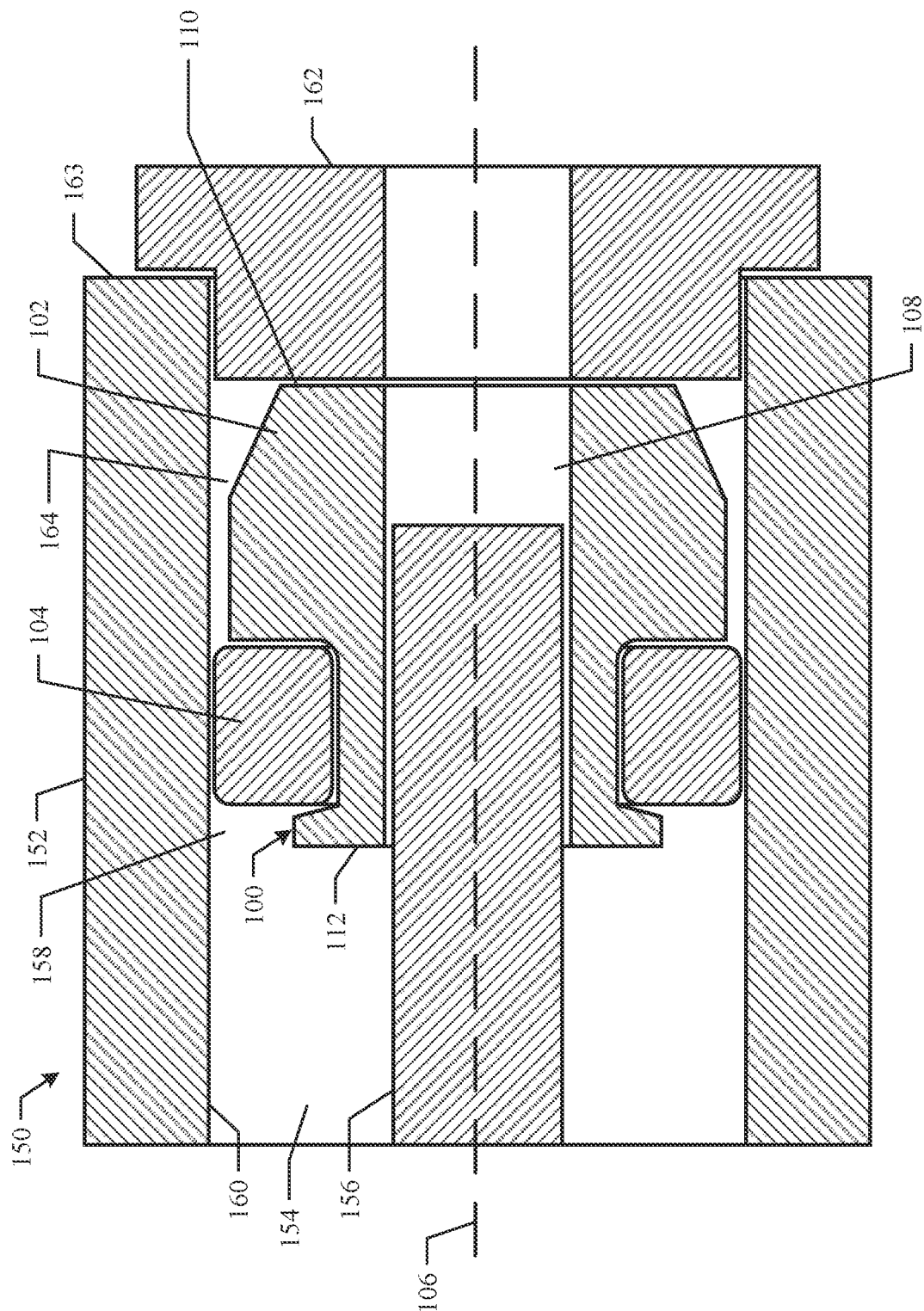
FIG. 10 is a cross-sectional, elevation view of the seal assembly illustrated in FIG. 8 positioned within a portion of a high pressure pump.

Referring to FIG. 10, a high pressure pump 150 (hereinafter "the pump") includes a pressure vessel 152 with a bore 154 extending there through. A plunger 156 extends into the bore 154 and reciprocates within the pressure vessel 152 to pressurize a fluid in the pressure vessel 152. The plunger 156 may be driven by, for example, a hydraulically actuated piston or a mechanical actuator.

The seal assembly 100 may seal a gap 158 between the plunger 156 and an inner wall 160 of the pressure vessel 152 that at least partially delineates the bore 154 to inhibit fluid from leaking from the pressure vessel 152. As shown, the seal assembly 100 may function as a dynamic seal between a moving member (e.g., the reciprocating plunger 156) and the inner wall 160. Additionally, or alternatively the seal assembly 100 (e.g., a second seal assembly 100) may function as a static seal that seals a portion of the gap 158 between a stationary member (e.g., a check valve body) and the inner wall 160. The pump 150 may include a sleeve (not shown) adjacent the inner wall 160 (e.g., between the first and second seal assemblies 100) that reduces a volume of the gap 158.

The seal body 102 may include a resilient material, such as an ultrahigh molecular weight polyethylene that fills the gap 158 without extruding out of the gap 158 when the pressure vessel 152 is pressurized. Accordingly, the seal body 102 may be relatively stiff at low pressures. The energizer 104 may be more flexible than the seal body 102 at low pressures to seal the gap 158 when the pressure within the pressure vessel 152 is relatively low, for example, at the beginning of a power stroke of the plunger 156.

The seal assembly 100 may further include a removable seal seat 162 that engages the seal body 102 and spaces the seal body 102 away from a face 163 of the pressure vessel 152. The seal seat 162 may be relatively stiff in a radial direction to resist deformation toward or away from the plunger 156, or the seal seat 162 may be sufficiently flexible in the radial direction to allow at least a portion of the seal seat 162 to flex toward the plunger 156 and provide an additional seal between the plunger 156 and the inner wall 160 as the seal seat 162 is axially compressed.

As described above, the seal assembly 100 may be dimensioned to minimize a volume of the fluid that gets behind the energizer 104 during a pressurization operation. As shown in the illustrated embodiment, the volume "behind" the energizer 104 is represented by a gap 164. It will be understood by those of skill in the art that the clearances/spacing between adjacent components is enlarged in the drawings to improve clarity of the illustrations and ease of identification of the components.

Fluid typically gets behind an energizer during a pressurization operation (e.g., during a power stroke of a plunger), resulting in any fluid that gets behind the energizer being highly pressurized. Upon completion of the power stroke, pressure within a main volume of a pressure chamber (i.e., in front of the energizer) drops. As the pressure in the main volume drops, a pressure imbalance forms on the front and back sides of the energizer until the trapped fluid escapes (e.g., "jets" across the energizer) to re-enter the main volume. This jetting may damage the energizer and negatively impact the life expectancy of the seal assembly.

The embodiments of the seal assembly 100 as described herein limit the volume of the fluid that gets behind the energizer 104 and enters the gap 164, thus limiting the potential damage caused when any such fluid re-enters the main volume of the pressure vessel 152.

In general, in the following claims, the terms used should not be construed to limit the claims to the specific implementations and embodiments disclosed in the specification and the claims, but should be construed to include all possible implementations and embodiments along with the full scope of equivalents to which such claims are entitled. Accordingly, the claims are not limited by the disclosure.

The invention claimed is:

1. A seal assembly comprising:
    a seal body that extends from a first end to a second end along a direction, the seal body including a groove formed at least in part by an energizer abutment surface, the seal body further including a lateral distance, wherein the lateral distance is a minimum dimension measured from the energizer abutment surface to the first end along the direction; and
    an energizer seated within the groove such that the energizer faces the energizer abutment surface, the energizer including an axial length, wherein the axial length is a maximum dimension of the energizer as measured along the direction,
    wherein a ratio of the lateral distance to the axial length is greater than or equal to 0.400 and less than or equal to 1.7087.

2. The seal assembly of claim 1 wherein the seal assembly includes a bore that extends through the seal body from the first end to the second end along a central axis of the seal body, and the central axis is parallel to the direction.

3. The seal assembly of claim 2 wherein the seal body is radially symmetrical about the central axis.

4. The seal assembly of claim 3 wherein a portion of the seal body includes a maximum dimension measured along a direction perpendicular to the central axis, and the portion is positioned between the groove and the first end with respect to the direction parallel to the central axis.

5. The seal assembly of claim 2 wherein the seal body includes an inner radius measured perpendicularly from the central axis to an inner surface of the seal body that forms at least a portion of the bore.

6. The seal assembly of claim 5 wherein a ratio of the lateral distance to the inner radius is greater than or equal to 0.10 and less than or equal to 0.401.

7. The seal assembly of claim 6 wherein the ratio of the lateral distance to the inner radius is greater than or equal to 0.10 and less than or equal to 0.20.

8. The seal assembly of claim 6 wherein the ratio of the lateral distance to the inner radius is greater than or equal to 0.20 and less than or equal to 0.401.

9. The seal assembly of claim 5 wherein the seal body includes a web thickness, which is a minimum distance measured perpendicularly with respect to the central axis from the inner surface of the seal body to the energizer abutment surface, and a ratio of the web thickness to the inner radius is greater than or equal to 0.068 and less than or equal to 0.0881.

10. The seal assembly of claim 9 wherein the web thickness is greater than or equal to 0.030 inches and less than or equal to 0.0385 inches.

11. The seal assembly of claim 5 wherein:
the seal body includes a groove height, which is a maximum distance measured perpendicular to the central axis from the energizer abutment surface to a plane tangent to a point on the outermost portion of seal body, and the plane being perpendicular to the groove height;
the energizer includes a radial height, which is a maximum cross-sectional dimension of the energizer measured perpendicular to the central axis; and
a ratio of the difference between the radial height and the groove height to the inner radius is greater than or equal to 0.015 and less than or equal to 0.3486.

12. The seal assembly of claim 2 wherein:
the seal body includes an inner radius measured perpendicularly from the central axis to an inner surface of the seal body that forms at least a portion of the bore;
the seal body includes a web thickness, which is a minimum distance measured perpendicularly with respect to the central axis from the inner surface of the seal body to the energizer abutment surface; and
a ratio of the web thickness to the inner radius is greater than or equal to 0.068and less than or equal to 0.0881.

13. The seal assembly of claim 12 wherein the web thickness is greater than or equal to 0.030 inches and less than or equal to 0.0385 inches.

14. The seal assembly of claim 2 wherein:
the seal body includes a groove height, which is a maximum distance measured perpendicular to the central axis from the energizer abutment surface to a plane tangent to a point on the outermost portion of seal body, and the plane being perpendicular to the groove height;
the energizer includes a radial height, which is a maximum cross-sectional dimension of the energizer measured perpendicular to the central axis; and
a ratio of the difference between the radial height and the groove height to the radial height is greater than or equal to 0.050 and less than or equal to 0.155.

15. The seal assembly of claim 1 wherein at least a portion of the energizer abutment surface is perpendicular to the direction, and the lateral distance is measured from the portion of the energizer abutment surface.

16. The seal assembly of claim 1 wherein the energizer abutment surface includes a curved portion with a radius of curvature that matches a radius of curvature of a portion of a perimeter of the energizer.

17. The seal assembly of claim 1 wherein the energizer is an O-ring with a circular cross-sectional shape.

18. The seal assembly of claim 1 wherein the ratio of the lateral distance to the axial length is greater than or equal to 0.400 and less than or equal to 0.600.

19. The seal assembly of claim 1 wherein the ratio of the lateral distance to the axial length is greater than or equal to 0.600 and less than or equal to 1.000.

20. The seal assembly of claim 1 wherein the ratio of the lateral distance to the axial length is greater than or equal to 1.000 and less than or equal to 1.400.

21. The seal assembly of claim 1 wherein the ratio of the lateral distance to the axial length is greater than or equal to 1.400 and less than or equal to 1.7087.

22. A seal assembly comprising:
a seal body that extends from a first end to a second end along a direction, the seal body including:
a groove formed at least in part by an energizer abutment surface;
a lateral distance, wherein the lateral distance is a minimum dimension measured from the energizer abutment surface to the first end along the direction;
a bore that extends through the seal body from the first end to the second end along a central axis of the seal body, wherein the central axis is parallel to the direction; and
an inner radius measured perpendicularly from the central axis to an inner surface of the seal body that forms at least a portion of the bore, wherein a ratio of the lateral distance to the inner radius is greater than or equal to 0.10 and less than or equal to 0.401.

23. The seal assembly of claim 22, further comprising:
an energizer seated within the groove such that the energizer faces the energizer abutment surface.

24. The seal assembly of claim 22 wherein the ratio of the lateral distance to the inner radius is greater than or equal to 0.10 and less than or equal to 0.20.

25. The seal assembly of claim 22 wherein the ratio of the lateral distance to the inner radius is greater than or equal to 0.20 and less than or equal to 0.401.

26. A seal assembly comprising:
a seal body that extends from a first end to a second end along a direction, the seal body including:
a groove formed at least in part by an energizer abutment surface;
a bore that extends through the seal body from the first end to the second end along a central axis of the seal body, wherein the central axis is parallel to the direction;
an inner radius measured perpendicularly from the central axis to an inner surface of the seal body that forms at least a portion of the bore; and
a web thickness, which is a minimum distance measured perpendicularly with respect to the central axis from the inner surface of the seal body to the energizer abutment surface, wherein a ratio of ratio of the web thickness to the inner radius is greater than or equal to 0.068 and less than or equal to 0.0881.

27. The seal assembly of claim 26, wherein the web thickness is greater than or equal to 0.030 inches and less than or equal to 0.0385 inches.

28. A seal assembly comprising:

a seal body that extends from a first end to a second end along a direction, the seal body including a groove formed at least in part by an energizer abutment surface;

a bore that extends through the seal body from the first end to the second end along a central axis of the seal body, and the central axis is parallel to the direction; and an energizer seated within the groove such that the energizer faces the energizer abutment surface, the energizer includes a radial height, which is a maximum cross-sectional dimension of the energizer measured perpendicular to the central axis;

wherein the seal body includes a groove height, which is a maximum distance measured perpendicular to the central axis from the energizer abutment surface to a plane that is: 1) tangent to a point on an outermost portion of the seal body with respect to the central axis and 2) perpendicular to the groove height, and wherein a ratio of the difference between the radial height and the groove height to the radial height is greater than or equal to 0.050 and less than or equal to 0.155.

29. A seal assembly comprising:

a seal body that extends from a first end to a second end along a direction, the seal body including a groove formed at least in part by an energizer abutment surface;

a bore that extends through the seal body from the first end to the second end along a central axis of the seal body, and the central axis is parallel to the direction; and an energizer seated within the groove such that the energizer faces the energizer abutment surface, the energizer includes a radial height, which is a maximum cross-sectional dimension of the energizer measured perpendicular to the central axis;

wherein the seal body includes a groove height, which is a maximum distance measured perpendicular to the central axis from the energizer abutment surface to a plane that is: 1) tangent to a point on an outermost portion of the seal body with respect to the central axis and 2) perpendicular to the groove height, wherein the seal body includes an inner radius measured perpendicularly from the central axis to an inner surface of the seal body that forms at least a portion of the bore, and wherein a ratio of the difference between the radial height and the groove height to the inner radius is greater than or equal to 0.015 and less than or equal to 0.3486.

* * * * *